United States Patent Office 2,805,990
Patented Sept. 10, 1957

2,805,990

IMPROVED DRILLING MUD AND METHOD OF USE

William E. Bergman, Bartlesville, Okla., assignor to Phillips Petroleum Company, a corporation of Delaware No Drawing. Application December 22, 1952, Serial No. 327,408

10 Claims. (Cl. 252—8.5)

This invention relates to an improved drilling fluid. In one specific aspect, it relates to an improved drilling mud having a reduced fluid loss. In another aspect, it relates to a drilling mud having improved rheological properties.

In the art of drilling wells, especially drilling by the rotary method, it is necessary to use a drilling mud, as is well understood in the art. The drilling mud performs many functions necessary to successful completion of the well being drilled. The drilling mud, in addition to performing other functions, lubricates the drill stem, carries the cuttings to the surface of the well, and forms a filter cake on the walls of the well preventing loss of at least any substantial amount of water from the drilling mud to the natural formations in the well. The weight of the mud prevents blowouts of formation pressures especially when weighting agents are employed. In order to perform these important functions properly, the drilling mud must have suitable viscosity and other qualities at all times in spite of adverse conditions encountered in drilling the well. Thixotropic properties of the mud support the cuttings during any time the pumps are shut down.

In drilling wells there are two major difficulties caused by natural formations penetrated. The first of these difficulties is that if salts such as sodium chloride or calcium sulfate are encountered the salt will cut ordinary drilling mud so that its viscosity is entirely too high, the clay particles are flocculated, and there is grave danger of the drilling pipe twisting in half or gas cutting or a blowout occurring due to the salt cutting of the mud. The other difficulty encountered is that when a formation known as heaving shale is penetrated, this heaving shale absorbs water from the drilling mud and by a caving or disintegration action common to bentonite materials, the well hole is closed around the drill string choking off the circulation of drilling mud and often seizing the drill string so that the drill string twists in half.

The aspects of this invention are attained by the following objects.

It is an object of this invention to provide a drilling mud having reduced water loss characteristics.

It is another object to provide a drilling mud whose viscosity and gel strength are maintained at a desired low level.

It is another object to provide a method for drilling an oil well bore through various formations without deleterious effect upon the drilling mud used.

It is still another object to provide an improved drilling mud that is resistant to the action of calcium sulfate and sodium chloride.

Other objects and advantages will be apparent to one skilled in the art upon reading the disclosure of this invention.

I have discovered that a latex can be incorporated into a drilling fluid and that the fluid loss characteristics of the drilling fluid are thereby substantially enhanced. Both natural rubber and synthetic rubber latices can be employed in the practice of my invention.

Latices of synthetic rubber which are applicable to the practice of my invention include polymers of conjugated dienes containing 4 to 6 carbon atoms per molecule, including styrene, 1-3 butadiene, chloroprene, isoprene, methyl pentadiene, 2-3 dimethyl 1-3 butadiene, alpha methyl styrene and halogenated styrenes. The polymers can be homopolymers or copolymers including terpolymers.

The latex can be stripped of any unpolymerized monomer after the polymerization is terminated or can be used as prepared. Monomers which remain in the latex exert no deleterious effect upon the drilling mud.

The latex, when prepared will usually contain from 20 to 30 weight percent of solids as dispersed rubber. The solids content, however, can be varied over wide limits according to the dilution requirements of the mud and can contain from 1 to 90 weight percent of solids. Latices can be prepared containing 90 weight percent solids and such concentrated latices are desirable for economy of transportation. The concentrated latex can be diluted to any desired solids content before being added to the drilling mud.

The pH of the latex is controlled by the emulsifier used and since most drilling muds are alkaline it is desirable to use an alkaline emulsifier in preparing the latex so as to avoid coagulation of the latex in the drilling mud.

The latices are prepared by conventional methods and can be added with the makeup water in the form of a low solid content latex or a more concentrated latex can be employed if dilution of the drilling mud is undesirable. The latex is compatible with a water base drilling mud and such drilling muds having latices incorporated therein have been found to be resistant to the action of calcium sulfate and sodium chloride.

In drilling a well with rotary tools, it is the usual practice to continually add water to make up for that which is lost to the formations through which the bore hole penetrates and to increase the volume or body of drilling mud as the well bore progresses downwardly. Finely ground materials resulting from the action of the bit are suspended in this additional water so as to create a continually enlarged volume of drilling mud.

It is both convenient and desirable to add this additional water in the form of a latex, which is low in solids, for example, one which contains from 1 to 50 weight percent solids, so as to maintain the concentration of latex in the body of drilling mud constant or to gradually increase the amount of latex in the body of drilling mud.

The following examples demonstrate the improvement of a water base drilling mud effected by the practice of this invention.

TESTS

The tests of the properties of the drilling muds were all made with standard drilling mud laboratory equipment employed in standard procedures.

The measurements of pH were all made with a Beckman "Laboratory Model G" pH meter. The viscosity measurements were all made with a Stormer viscosimeter 1931 model made by Arthur H. Thomas Company. The mixing of samples was always for 30 minutes with a Hamilton Beach No. 33 high speed mixer. Sodium chloride and calcium sulfate content was controlled by adding weighed amounts. The filter cake thickness and water losses were all determined with an "A. P. I. low pressure wall building tester filter press" with a pressure of 100 lbs. per square inch applied for 30 minutes. All temperatures were approximately room temperature. All barrels are 42 U. S. gallon barrels.

MATERIALS

The 6 percent bentonite mud used in these tests was prepared by mixing 6 weight percent of Wyoming bentonite in distilled water. The mixture was passed through a colloid mill so as to thoroughly disperse the bentonite. The polybutadiene latex used in the examples was prepared using the following recipe.

Table I

| | Parts by weight |
|---|---|
| Water | 180.00 |
| Butadiene | 100.00 |
| Sodium alkyl toluene sulfate | 1.500 |
| Diisopropylbenzene hydroperoxide | 0.097 |
| KOH | 0.040 |
| $K_4P_2O_7$ | 0.177 |
| $FeSO_4 \cdot 7H_2O$ | 0.140 |
| Mercaptan blend [1] | 0.500 |
| Booster added after 2.5 hours: | |
| $H_2O$ | 5.000 |
| Diisopropylbenzene hydroperoxide | 0.049 |
| $K_4P_2O_7$ | 0.088 |
| $FeSO_4 \cdot 7H_2O$ | 0.070 |
| Reaction time | 12.6 hours @ 41° F. |
| Conversion | 61.4 percent. |
| Mooney viscosity | 44 (vented). |
| Gel | 0. |
| Total solids | ~25 weight percent. |

[1] A blend of tertiary $C_{12}$, $C_{14}$ and $C_{16}$ aliphatic mercaptans in a ratio of 3:1:1 parts by weight.

The butadiene-styrene latex was made according to the following recipe.

Table II

| | Parts by weight |
|---|---|
| Water | 180.000 |
| Butadiene | 72.000 |
| Styrene | 28.000 |
| Alkyl aryl sodium sulfonate | 0.750 |
| Tert-butylisopropylbenzene hydroperoxide | 0.114 |
| KOH | 0.040 |
| $K_4P_2O_7$ | 0.177 |
| $FeSO_4 \cdot 7H_2O$ | 0.140 |
| Mercaptan blend [1] | |

[1] A blend of tertiary $C_{12}$, $C_{14}$ and $C_{16}$ aliphatic mercaptans in a ratio of 3:1:1 parts by weight.

The results of tests conducted upon bentonite base drilling mud compositions containing polybutadiene latex are tabulated in Table III. The addition of the latex to the 6 percent bentonite results in dilution of the mud therefore the results are compared to those of a diluted bentonite mud.

Table III

| Composition of Mud, Percent by volume | | | Added to mud, lb/bbl. | | | | Visc., cps. | Gels, g., 0-10 min. | Water-loss, ml./30 min. |
|---|---|---|---|---|---|---|---|---|---|
| 6% bentonite | latex | water | Queb. | NaOH | CaSO4 | NaCl | | | |
| 100 | 0 | 0 | 0 | 0 | 0 | 0 | 35 | 0-30 | 12.0 |
| 0 | 100 | 0 | 0 | 0 | 0 | 0 | 3 | 0-0 | 11.5 |
| 0 | 100 | 0 | 1.0 | 1.0 | 0 | 0 | 2.5 | 0-0 | 10.2 |
| 50 | 0 | 50 | 0 | 0 | 0 | 0 | 3.0 | 0-0 | 19.5 |
| 50 | 50 | 0 | 0 | 0 | 0 | 0 | 8 | 0-0 | 7.0 |
| 50 | 0 | 50 | 0 | 0 | 0 | 2 | 10 | 5-10 | 19.0 |
| 50 | 14 | 36 | 0 | 0 | 0 | 2 | 12 | 5-5 | 13.5 |
| 50 | 29 | 21 | 0 | 0 | 0 | 2 | 16 | 5-8 | 10.0 |
| 50 | 43 | 7 | 0 | 0 | 0 | 2 | 18 | 5-8 | 6.5 |
| 50 | 0 | 50 | 1.0 | 0.5 | 0 | 0 | 3 | 0-0 | 17.0 |
| 50 | 50 | 0 | 1.0 | 0.5 | 0 | 0 | 5 | 0-2 | 7.5 |
| 50 | 0 | 50 | 1.0 | 0.5 | 0.5 | 0 | 3.5 | 0-0 | 15.5 |
| 50 | 50 | 0 | 1.0 | 0.5 | 0.5 | 0 | 7.0 | 0-0 | 6.0 |
| 50 | 0 | 50 | 1.0 | 0.5 | 1.0 | 0 | 4 | 0-5 | 19.0 |
| 50 | 50 | 0 | 1.0 | 0.5 | 1.0 | 0 | 10 | 0-10 | 7.2 |
| 50 | 0 | 50 | 1.0 | 0.5 | 3.0 | 0 | 14 | 10-40 | 36 |
| 50 | 50 | 0 | 1.0 | 0.5 | 3.0 | 0 | 62 | 20-35 | 14 |
| 50 | 0 | 50 | 1.0 | 0.5 | 0 | 1 | 2 | 0-0 | 16 |
| 50 | 50 | 0 | 1.0 | 0.5 | 0 | 1 | 5 | 0-0 | 7.0 |
| 50 | 0 | 50 | 1.0 | 0.5 | 0 | 2 | 3 | 0-1 | 16 |
| 50 | 50 | 0 | 1.0 | 0.5 | 0 | 2 | 17 | 0-1 | 7.0 |
| 50 | 0 | 50 | 1.0 | 0.5 | 0 | 4 | 6 | 0-2 | 16 |
| 50 | 50 | 0 | 1.0 | 0.5 | 0 | 4 | 10 | 0-3 | 6.5 |

The results of tests conducted upon bentonite base drilling muds treated with a butadiene-styrene latex are tabulated in Table IV.

Table IV

| Composition of Mud, percent by volume | | | Added to Mud, lb./bbl. | | | | Vis., cps. | Water Loss, ml./30 min. |
|---|---|---|---|---|---|---|---|---|
| 6% bentonite | latex | water | quebracho | NaOH | CaSO4 | | | |
| 0 | 100 | 0 | 0 | 0 | 0 | | --- | 25.0 |
| 50 | 0 | 50 | 0 | 0 | 0 | | 3 | 19.5 |
| 50 | 50 | 0 | 0 | 0 | 0 | | 9 | 9.2 |
| 50 | 0 | 50 | 1.0 | 0.5 | 0 | | 3 | 17.0 |
| 50 | 50 | 0 | 1.0 | 0.5 | 0 | | 4 | 9.0 |
| 50 | 0 | 50 | 1.0 | 0.5 | 1.0 | | 4 | 19.0 |
| 50 | 50 | 0 | 1.0 | 0.5 | 1.0 | | 8 | 8.5 |

The amount of latex added will be determined by the fluid loss requirements of the drilling mud and the solids content of added latex will be determined by the demand for water on the part of the drilling mud. The amount of latex added in terms of total solid and expressed as pounds per barrel of drilling mud will vary over wide ranges and can be from 5 to 75 pounds per barrel although both smaller and larger amounts are contemplated in the practice of this invention usually the amount of solids will be in the order of 10 to 60 pounds per barrel, preferably 30 to 60 pounds per barrel.

Although the examples in this case are directed to the treatment of a water base drilling mud, the latices of this invention can also be incorporated in emulsion-type drilling muds and in oil-base drilling muds. The more concentrated latices having solids contents in the order of 80 to 90 weight percent of the latex are preferred for use in an oil-base drilling mud in order to avoid cutting the oil with added water. When used with emulsion-type drilling muds, the water in the latex will act to dilute the water phase of an oil-in-water emulsion or will be dispersed in a water-in-oil emulsion. Thus, the solids content of the latex used in an emulsion-type drilling mud will be determined by the water requirements of the drilling mud treated.

Variations and modifications are possible within the scope of the disclosure of this invention, the essence of which is that latices have been found to be excellent drilling mud additives.

I claim:

1. In a process for drilling a well with well drilling tools wherein there is circulated in the well a water base drilling mud containing colloidal particles of clayey material suspended in sufficient water to render the same circulatable, the method of forming a filter cake on the wall of said well so as to decrease the loss of fluid from said drilling mud contained therein into surrounding earthen formations which comprises admixing with said drilling mud a rubber latex in an amount and a total solids concentration sufficient so as to lower the fluid loss through said filter cake and to maintain the viscosity of said drilling mud within desired limits and contacting said wall of said well with the resulting drilling mud so as to form said filter cake thereon.

2. The process of claim 1 wherein said latex is a natural rubber latex.

3. The process of claim 1 wherein said latex is a synthetic rubber latex.

4. A water base drilling mud comprising in combination sufficient water to maintain the mud as a fluid; sufficient bentonitic clay to form a filter cake on the wall of the well; about 1½ to 2 pounds of a mixture of sodium hydroxide and quebracho per barrel of drilling mud; and from 5 to 75 pounds of rubber, as a latex, per barrel of drilling mud.

5. The drilling mud composition of claim 4 wherein the latex is a natural rubber latex.

6. The drilling mud composition of claim 4 wherein the latex is a synthetic rubber latex.

7. In a process for drilling a well with well drilling tools wherein there is circulated in the well a water-base drilling mud containing colloidal particles of clayey material suspended in sufficient water to render the same circulatable, the method of forming a filter cake on the wall of said well so as to decrease the loss of fluid from said drilling mud contained therein into surrounding earthen formations which comprises continually adding to said circulating mud a rubber latex so as to maintain the amount of rubber in the drilling mud in the range of 5 to 75 pounds of rubber per barrel of drilling mud; and circulating said drilling mud.

8. The process of claim 7 wherein the latex is a polybutadiene latex containing from 1 to 50 weight percent of dispersed solids.

9. The process of claim 7 wherein the latex is a butadiene-styrene latex containing from 1 to 50 weight percent of dispersed solids.

10. A water base drilling mud comprising a suspension of about 6 weight percent of clayey material in water; about 2 pounds per barrel of drilling mud of a mixture of sodium hydroxide and quebracho; and from 5 to 75 pounds per barrel of drilling mud of rubber as a latex.

References Cited in the file of this patent

UNITED STATES PATENTS

| | | |
|---|---|---|
| 2,217,927 | Van Campen | Oct. 15, 1940 |
| 2,342,588 | Larkin | Feb. 22, 1944 |
| 2,380,156 | Dobson | July 10, 1945 |
| 2,481,339 | Penfield | Sept. 6, 1949 |
| 2,502,191 | Williams | Mar. 28, 1950 |
| 2,537,114 | Young et al. | Jan. 9, 1951 |
| 2,612,485 | Baer | Sept. 30, 1952 |
| 2,623,851 | Salathiel | Dec. 30, 1952 |
| 2,697,071 | Kennedy et al. | Dec. 14, 1954 |
| 2,743,233 | Fisher | Apr. 24, 1956 |

OTHER REFERENCES

Bowie-Hardening of Mud Sheaths, Bureau of Mines Report of Investigations No. 3354, Nov. 1937, pages 7, 8, 9, 13, 15 and 17.